May 19, 1942.  F. R. REDMAN  2,283,698
LAUNDERABLE MULTI-PLY FABRIC
Filed Oct. 7, 1936
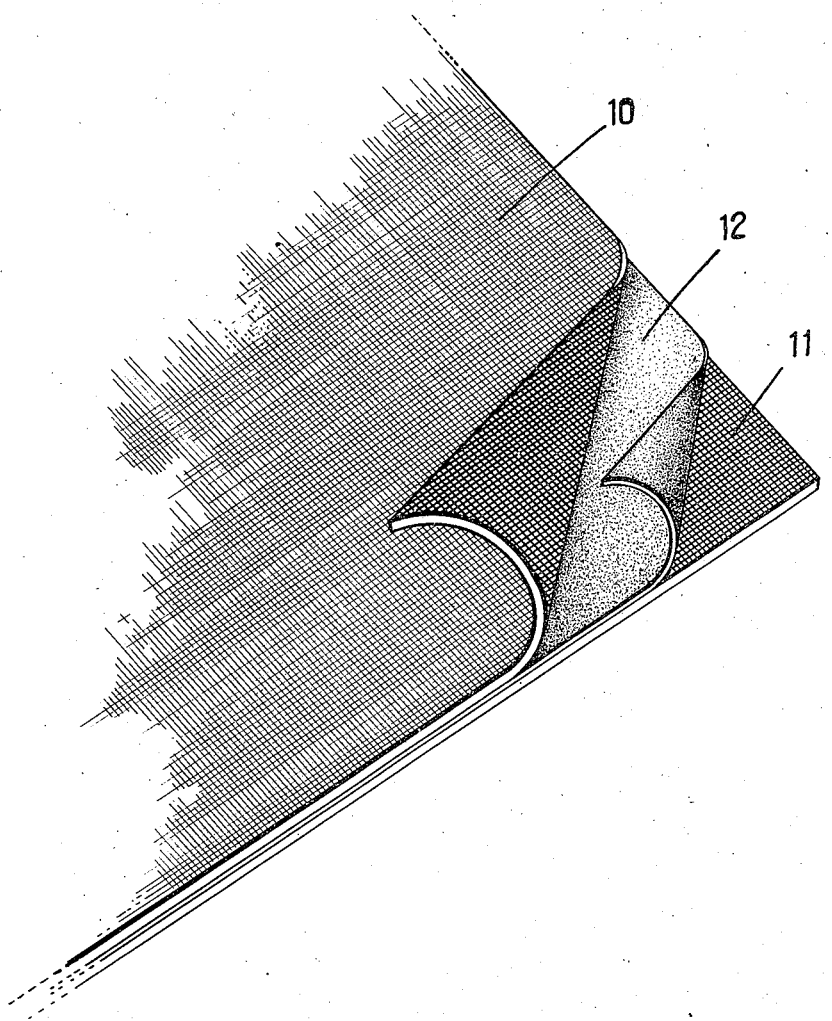
Frank R. Redman
INVENTOR.
BY Brown + Jones
ATTORNEYS.

Patented May 19, 1942

2,283,698

UNITED STATES PATENT OFFICE 2,283,698

LAUNDERABLE MULTIPLY FABRIC

Frank R. Redman, Yardley, Pa., assignor to Cluett, Peabody & Co., Inc., Troy, N. Y., a corporation of New York Application October 7, 1936, Serial No. 104,396

4 Claims. (Cl. 154—46)

This invention relates to a new process of laminating fabrics or the like, and to the product thereof. More specifically the invention relates to a new and improved method of producing a multi-ply fabric wherein a sheet-like film of adhesive is employed as the bonding material, and to the product of such a method, which comprises a plurality of bonded or laminated fabric layers bonded together by means of a sheet or film of adhesive.

Objects of the invention are to provide an economical and easily performed method for the lamination of a fabric or similar material to another suitable material; to provide such a method wherein a substantially permanent bond is effected; to provide such a method wherein the bond is produced by the application of a relatively small pressure and relatively low heat; to provide such a method wherein the use of an impregnated liner or similar element may be dispensed with, and to provide such a method wherein the laminated plies may be subjected to the action of laundry fluids and to the heat incident to laundering without affecting the bond.

Other objects of the invention are to provide a laminated fabric structure comprising a plurality of layers of fabric and a layer of sheet-like adhesive or cement; to provide such a structure wherein the bond between the fabric layers is substantially permanent; to provide such a structure as will withstand the action of the heat and cleansing fluids in laundering; to provide such a structure comprising an adhesive comprising a pigment; and to provide such a structure wherein no lining or other impregnated material is employed to produce the desired stiffening of the lamination.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of the invention, reference should be had to the accompanying drawing, which illustrates in perspective a multi-ply fabric of the invention, where 10 is one fabric layer, 11 another fabric layer, and 12 the thermoplastic, sheet-like adhesive or cement.

Heretofore, various materials have been employed as stiffeners or adhesives in the manufacture of laminated fabrics. For example, synthetic resins, cellulosic products and the like have been used, and mixtures of these materials have been employed. Speaking generally, these materials have usually been applied to the lining or intermediate fabric in the form of a paste or solution, and the lining or intermediate fabric has to a great extent been impregnated with the adhesive or cement employed. Where a lining or similar intermediate fabric is not employed, the adhesive has been applied directly to the fabrics to be laminated in the form of a paste or solution, and the coated fabrics have been heated and placed between pressure rolls or other means to apply a very considerable pressure thereto to effect a satisfactory bond. Under these circumstances also the applied adhesive has penetrated deeply into the coated fabric, and in many cases the impregnation of the fabric by the adhesive has caused the destruction of the real texture and design of the cloth. This has been especially the case where high pressures have been employed in the laminating process.

Where a lining material is employed, as in the manufacture of collars and the like, the material is impregnated or coated with the adhesive and then laminated with the outer layers of fabric under pressures which may amount to eighty pounds per square inch and in the presence of heat. Frequently, although a satisfactory bond may be effected where an adequate amount of adhesive is employed, the lining material may shrink to a different degree from that of the material employed in the outer layers of fabric, resulting in the formation of undesired wrinkles in the collar cloth. Furthermore, in all such types of lamination, i. e., where a paste-like adhesive or a solution of the adhesive is applied to a fabric and where it impregnates the fabric, the bond, while apparently satisfactory, will yield to a relatively slight pull.

I have found that where a lamination is effected by employing a sheet or film of adhesive, a far better bond is secured and the bond may be obtained by employing relatively slight pressures and relatively low temperatures.

Furthermore, only a relatively small amount of cement need be employed. For example, if an impregnated lining cloth is employed, it may be necessary to use from three to four ounces per square yard of a thermoplastic adhesive. Of this amount approximately two ounces enters into the lining cloth, leaving a relatively small amount of adhesive on each surface. I have found that while such an impregnated cloth may be employed to give fairly satisfactory results in the formation of a laminated fabric, far better results may be obtained by the use of a film or sheet adhesive weighing approximately two ounces per square yard. With such an adhesive positioned directly between the two layers of cloth to be laminated, a very satisfactory bond may be secured with the use of relatively light pressures and relatively low temperatures, for example, the pressures and temperatures ordinarily employed in connection with hand-ironing. Satisfactory bonds have been secured employing the sheet or film-like adhesive with pressures not exceeding eight pounds per square inch.

Where the laminated article is one subjected to laundering and the like, it has been found, where an impregnated lining is used in securing the bond, that frequently spotty separations between the outer fabric and the lining arise during laundering. This may be due to the fact that so much of the adhesive has become impregnated into the lining that there is an insufficient amount remaining on the surface to effect an adequate bond. In any event, I have found that where a sheet or film-like adhesive is employed, no separation is apparent between the outer fabric and the lining even after repeated launderings.

Suitable materials for use in the present invention are sheets or films of (1) vinyl chloride with or without a plasticizer, although preferably with from 10% to 40% of any suitable plasticizer; (2) vinyl acetate, preferably plasticized to some extent; (3) a mixture of vinyl chloride and vinyl acetate, for example in the proportions of seven parts of vinyl chloride to three parts of vinyl acetate, and preferably with the addition of approximately two parts of any suitable plasticizer; (4) a mixture of equal parts of vinyl acetate and acrylate preferably plasticized; (5) an acrylate, preferably with about 20% of a plasticizer; (6) a mixture of approximately four parts vinyl chloride, five parts of an acrylate, one part of vinyl acetate, and a suitable amount of plasticizer; (7) a styrol, for example, a polystyrol, with approximately 20% to 30% plasticizer; (8) mixtures of equal parts of a styrol and vinyl acetate with a suitable amount of plasticizer; (9) mixtures of equal parts of a styrol and an acrylate with a suitable amount of a plasticizer; (10) mixtures of approximately equal parts of vinyl chloride, vinyl acetate, styrol and an acrylate with a suitable amount of plasticizer; (11) a mixture of three parts of cellulose acetate to one part of vinyl acetate with, for example, one part of a plasticizer; (12) a mixture of five parts of cellulose acetate, three parts of vinyl chloride, and one and one-half parts of vinyl acetate with approximately two parts of a suitable plasticizer.

Suitable plasticizers are dibutyl phthalate, or, where cellulose acetate is employed, tricresyl phosphate. It will be obvious that other plasticizers may be employed. So also, films or sheets comprising nitrocellulose and other thermoplastic cellulosic products may be employed, as may other mixtures of the vinyl compounds and their polymers. It will also be understood that pigments may be advantageously added to the adhesive, preferably pigments of the same color as that of the fabric being laminated. The examples given above are intended to be illustrative only.

The adhesives are employed in sheet form and the adhesive and the material to be laminated are preferably pre-cut to the desired form, then brought into contact and heated to a point below the scorching point of the material but above the melting point of the adhesive in the presence of a relatively light pressure, which may not exceed two to five pounds per square inch. However, greater pressures may be employed if desired without detriment to the process or product of the invention.

The sheet-like adhesive should preferably not only be thermoplastic at temperatures below the searching point of the fabrics employed in the lamination, but it should also be pliable to an extent that it does not break readily when handled, i. e., it should preferably not be brittle, and it should be non-tacky when dry, so that it does not stick to the hands of the operators or to the tools employed in cutting and shaping the sheet before lamination.

Where the sheet adhesive is to be employed in connection with fabrics subjected to laundering, it should preferably comprise materials such as are already known to possess good adhesive properties at the temperature of boiling water, and preferably materials which do not change color in the presence of soaps and other substances used in laundering. An excellent adhesive for such purposes may comprise a mixture of the conjoint polymer of vinyl chloride and vinyl acetate with the simple polymer of vinyl acetate in the proportions shown, for example, in the recently issued patent to Freydberg, No. 2,053,773.

While the process of the present invention and the product thereof have been described primarily in connection with the lamination of layers of fabric for use in connection with such articles as collars and the like, where the article is to be laundered and at the same time retain its stiffness, the process has other applications. The use of a sheet-like adhesive in laminating may be employed in connection with the lamination of fabric to leather, or fabric to metal, as for example in connection with automobile accessories.

It will be obvious also that more than two layers of fabric may be united. If, for example, a heavy stiff cloth is desired, three or more layers may be joined by the use of relatively thin films of sheet adhesive therebetween. For example, under certain conditions it may be desirable to employ a lining or stiffening member. Where a sheet adhesive is employed, the liner, with a sheet of the adhesive on either side thereof, may be fed through a heated roller or otherwise subjected to pressure, so that the film or sheet of adhesive adheres to each surface of the liner. This composite of liner or stiffener with a film of adhesive adhering lightly to each surface may then be employed in the manner heretofore explained in the process of lamination with two fabric plies. With such a process a very satisfactory bond is obtained, even though the amount of adhesive employed may be less than half that formerly used.

Since certain changes in carrying out the above process, and certain modifications in the article which embody the invention may be made without departing from its scope, it is intended that all matter contained in the above description or shown in the accompanying drawing shall be interpreted as allustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A multi-ply fabric for use in articles subjected to laundering comprising a plurality of fabric plies having therebetween a preformed sheet of a thermoplastic adhesive comprising an acrylate adapted to retain its adhesive and color properties at laundering temperatures and in the presence of laundering fluids, and adapted to be rendered thermoplastic at temperatures below the scorching point of said fabric, each of said plies and said therein between bonded sheet being permeable after laundering to laundering fluids at laundering temperatures.

2. A multi-ply fabric for use in articles subjected to laundering comprising a plurality of fabric plies having therebetween a preformed sheet of a thermoplastic adhesive comprising a styrol, adapted to retain its adhesive and color properties at laundering temperatures and in the presence of laundering fluids, and adapted to be rendered thermoplastic at temperatures below the scorching point of said fabric, each of said plies and said therein between bonded sheet being permeable after laundering to laundering fluids at laundering temperatures.

3. A multi-ply fabric for use in articles subjected to laundering comprising a plurality of fabric plies having therebetween a preformed sheet of a thermoplastic adhesive comprising about equal parts of a styrol and vinyl acetate and being adapted to retain its adhesive and color properties at laundering temperatures and in the presence of laundering fluids, and adapted to be rendered thermoplastic at temperatures below the scorching point of said fabric, each of said plies and said therein between bonded sheet being permeable after laundering to laundering fluids at laundering temperatures.

4. A multi-ply fabric for use in articles subjected to laundering comprising a plurality of fabric plies having therebetween a preformed sheet of a thermoplastic adhesive comprising a mixture of about equal parts of vinyl chloride, vinyl acetate, a styrol and an acrylate and being adapted to retain its adhesive and color properties at laundering temperatures and in the presence of laundering fluids, and adapted to be rendered thermoplastic at temperatures below the scorching point of said fabric, each of said plies and said therein between bonded sheet being permeable after laundering to laundering fluids at laundering temperatures.

FRANK R. REDMAN.